United States Patent
Park et al.

(10) Patent No.: US 7,941,042 B2
(45) Date of Patent: May 10, 2011

(54) AUTO-FOCUS METHOD, MEDIUM, AND APPARATUS FOR IMAGE-CAPTURING

(75) Inventors: Byung-kwan Park, Seoul (KR); Sung-su Kim, Yongin-si (KR); Byoung-ho Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 302 days.

(21) Appl. No.: 12/081,499

(22) Filed: Apr. 16, 2008

(65) Prior Publication Data

US 2009/0074396 A1 Mar. 19, 2009

(30) Foreign Application Priority Data

Sep. 14, 2007 (KR) ........................ 10-2007-0093723

(51) Int. Cl.
*G03B 3/00* (2006.01)
*G03B 13/00* (2006.01)

(52) U.S. Cl. .................. 396/128; 396/125; 348/345
(58) Field of Classification Search .................. 396/128
See application file for complete search history.

(56) References Cited

U.S. PATENT DOCUMENTS

| 7,372,486 | B2* | 5/2008 | Shinohara et al. | ....... 348/240.99 |
| 2003/0117511 | A1* | 6/2003 | Belz et al. | ................ 348/333.11 |
| 2007/0019104 | A1* | 1/2007 | Inoue et al. | .................... 348/345 |
| 2007/0036427 | A1 | 2/2007 | Nakamura et al. | ............ 382/154 |

FOREIGN PATENT DOCUMENTS

| JP | 2001-61155 | 3/2001 |
| KR | 2001-0073576 | 8/2001 |
| KR | 10-2006-0065099 | 6/2006 |

* cited by examiner

*Primary Examiner* — W. B. Perkey
*Assistant Examiner* — Bret Adams
(74) *Attorney, Agent, or Firm* — Staas & Halsey LLP

(57) ABSTRACT

An auto-focus method, medium, and apparatus for image-capturing. The auto-focus method includes obtaining a first image by placing a focus lens of a corresponding image-capturing apparatus at a first fixed position, obtaining a second image by placing the focus lens at a second fixed position; calculating blur levels of the first and second images, and determining a position of the focus lens by substituting the blur levels of the first and second images into each of a plurality of blur level relational expressions, which are derived from a plurality of pairs of images of respective corresponding objects at different distances from an image sensor module, each of the pairs of images being obtained by placing the focus lens at the first and second fixed positions, respectively.

26 Claims, 12 Drawing Sheets

AT DISTANCE OF 100 CM FROM SUBJECT

AUTO-FOCUS METHOD, MEDIUM, AND APPARATUS FOR IMAGE-CAPTURING

CROSS-REFERENCE TO RELATED APPLICATIONS

This application claims priority from Korean Patent Application No. 10-2007-0093723 filed on Sep. 14, 2007 in the Korean Intellectual Property Office, the disclosure of which is incorporated herein by reference in its entirety.

BACKGROUND

1. Field

One or more embodiments of the present invention relate to an auto-focus method, medium, and apparatus for image-capturing, and, more particularly, to an auto-focus method, medium, and apparatus for image-capturing where the focus can be automatically adjusted at high speed without needing to switch between a normal mode and a macro mode regardless of the distance between a lens and an object by using the blur levels of a number of images.

2. Description of the Related Art

Auto-focus, a feature of modern cameras, is a technique of automatically adjusting the focus by detecting a subject based on a signal of the subject captured by a camera lens, and automatically driving a focus lens according to the result of the detection.

Efforts have been made to improve the quality of images captured by image-capturing apparatuses such as digital cameras or digital camcorders using an auto-focus function.

FIG. 1 illustrates a graph of the relationship between the precision of the focus and the position of a focus lens. The position of a focus lens of an image-capturing apparatus varies according to the distance between the focus lens and a subject. Conventionally, methods such as high pass filtering and hill climbing have been widely used where an optimum focal point is determined by comparing the precision of the focus at one focus lens position with the precision of focus at another focus lens position while continuously varying the position of a focus lens. These methods, however, require a considerable number of images to determine an optimum focal point and may thus cause a shutter lag. As such, these methods may not be suitable for use in high-speed photography.

Other conventional auto-focus methods involve obtaining images by placing a focus lens at two fixed positions, respectively; adding up the images or subtracting the images from each other in units of pixels; and determining an optimum position of a focus lens by analyzing frequency components of the results of the addition or the subtraction. However, these auto-focus methods require the edges of two images to be added or subtracted from each other to precisely coincide with each other, and also require a considerable amount of computation.

In addition, these other auto-focus methods require switching between a macro mode for performing close-range photography and a normal mode for performing regular photography. Therefore, no auto-focus methods without the requirement of mode switching have yet been suggested.

SUMMARY

One or more embodiments of the present invention provide an auto-focus method, medium, and apparatus for image-capturing where the focus can be automatically adjusted at high speed without the need to switch between a normal mode and a macro mode regardless of the distance between a focus lens and an object by using the blur levels of images that are obtained by placing the focus lens at least at two fixed positions, respectively, or at a maximum of three fixed positions, respectively.

Additional aspects and/or advantages will be set forth in part in the description which follows and, in part, will be apparent from the description, or may be learned by practice of the invention.

According to an aspect of the present invention, there is provided an auto-focus method for image-capturing, the auto-focus method including obtaining a first image by placing a focus lens of a corresponding image-capturing apparatus at a first fixed position, obtaining a second image by placing the focus lens at a second fixed position, calculating blur levels of the first and second images, and determining a position of the focus lens by substituting the blur levels of the first and second images into each of a plurality of blur level relational expressions, which are derived from a plurality of pairs of images of respective corresponding objects at different distances from an image sensor module, each of the pairs of images being obtained by placing the focus lens at the first and second fixed positions, respectively.

According to another aspect of the present invention, there is provided an auto-focus apparatus for image-capturing, the auto-focus apparatus including an image sensor module which obtains an image by converting an optical signal into an electric signal; a blur-level-calculation module which calculates a blur level of the image; and a focus lens-position-calculation module which determines a position of a focus lens by substituting the blur level of the image into a plurality of blur level relational expressions for respective corresponding objects at various distances from the image sensor module, wherein the image sensor module obtains a first image by placing a focus lens of a corresponding image-capturing apparatus at a first fixed position, and obtains a second image by placing the focus lens at a second fixed position, the blur-level-calculation module calculates blur levels of the first and second images, and the focus lens-position-calculation module determines the position of the focus lens by substituting the blur levels of the first and second images into each of a plurality of blur level relational expressions, which are derived from a plurality of pairs of images of respective corresponding objects at different distances from the image sensor module, each of the pairs of images being obtained by placing the focus lens at the first and second positions, respectively.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
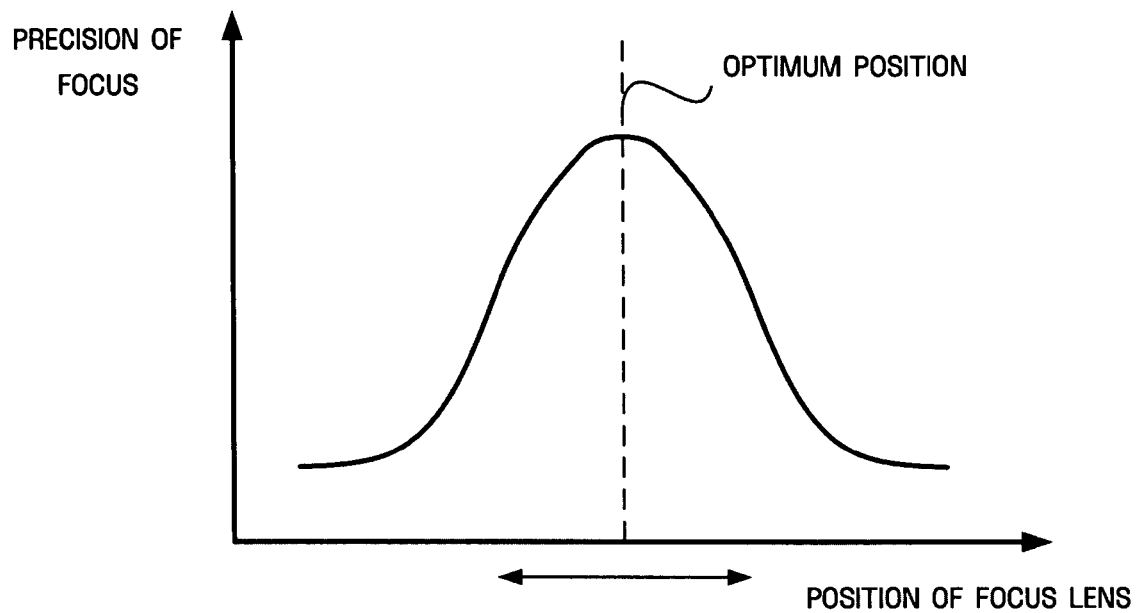
FIG. 1 illustrates a graph of the relationship between the precision of focus and the position of a focus lens.

Reference will now be made in detail to the embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

An auto-focus function involves calculating the optimum position of a focus lens through image processing when a user presses a shutter to capture an image, and placing the focus lens at the optimum position. Once the focus lens is placed at the optimum position, a final image is captured. In order to obtain a final image which is similar to an image obtained when a user presses a shutter, it is necessary to quickly determine an optimum position of a focus lens. The present invention provides quickly determining the optimum position of a focus lens.

Figure 2:
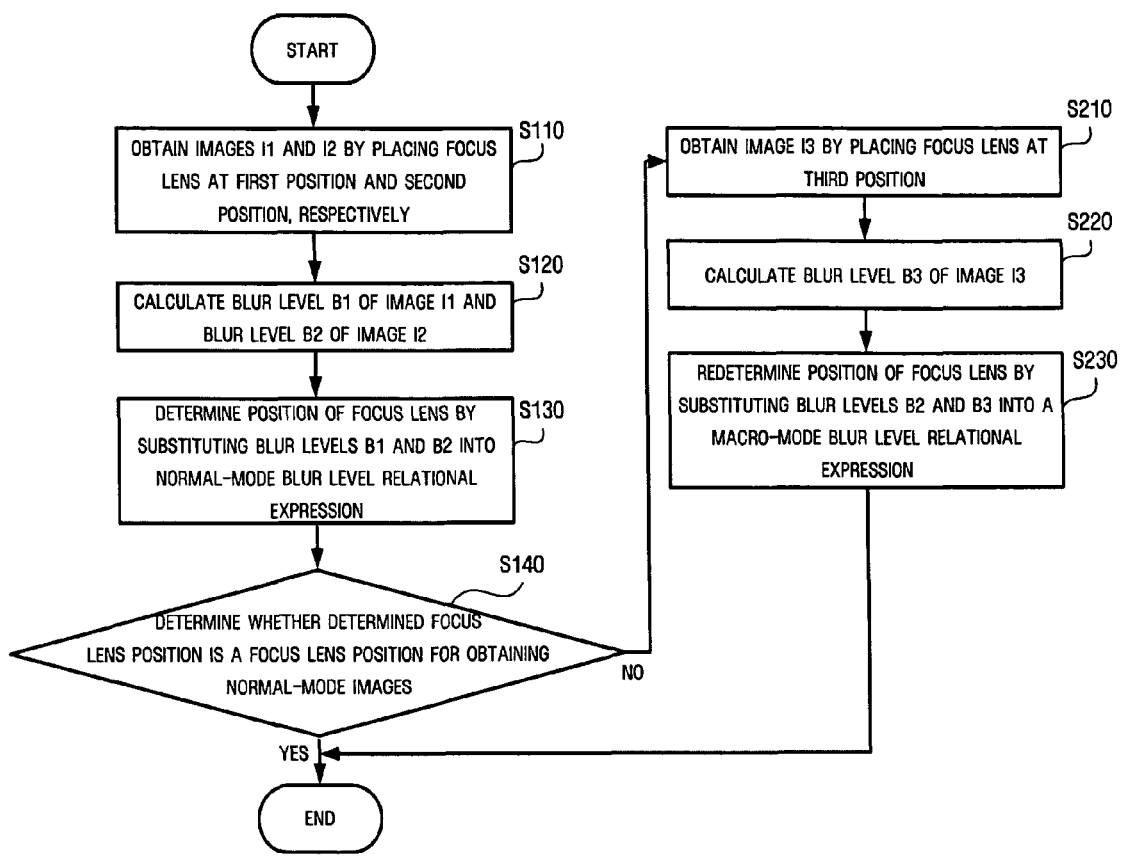
FIG. 2 illustrates a flowchart of an auto-focus method for image-capturing, according to an embodiment of the present invention.

FIG. 2 illustrates a flowchart of an auto-focus method for image-capturing, according to an embodiment of the present invention. Referring to FIG. 2, when a user presses a shutter of a corresponding image-capturing apparatus in order to capture an image, a first image I1 is obtained by placing a focus lens of the image-capturing apparatus at a first fixed position, and a second image I2 is obtained by placing the focus lens at a second fixed position S110.

Figure 3:
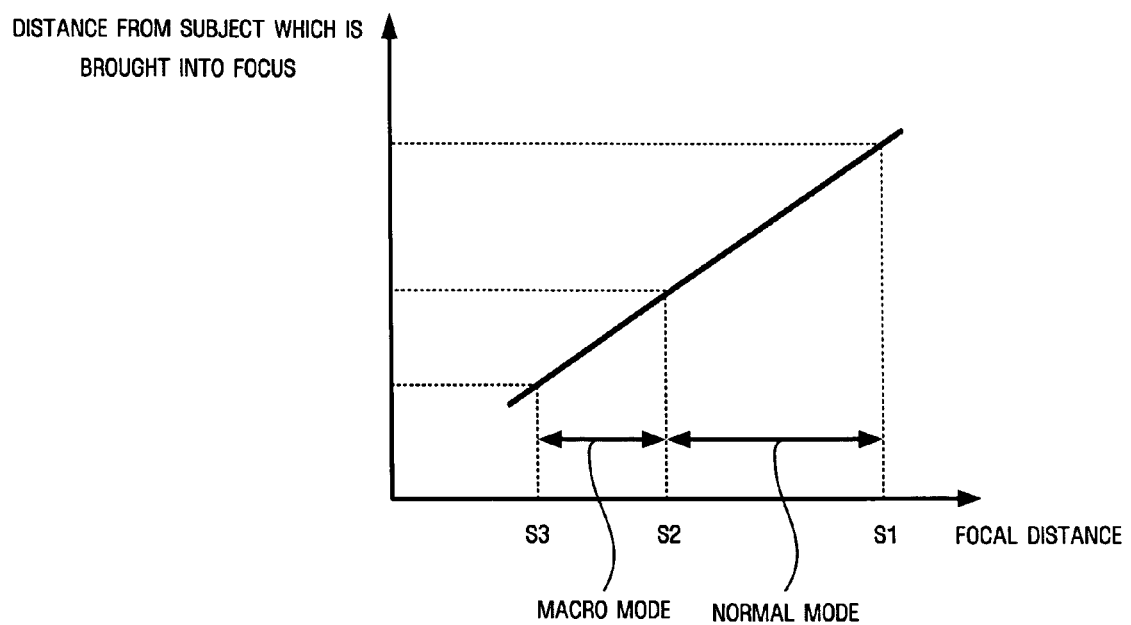
FIG. 3 illustrates a graph of the relationship between a focal distance and the distance from a subject which is brought into focus.

FIG. 3 illustrates a graph of the relationship between a focal distance and the distance from a subject which is brought into focus. It is assumed that a focal distance is the distance between a focus lens and an image sensor module which senses an optical signal reflected from a subject. As the focal distance increases, an object distant from an image-capturing apparatus becomes more likely than an object less distant from the image-capturing apparatus to be brought into focus. Thus, an image of an object distant from an image-capturing apparatus is clearer than an image of an object less distant from the image-capturing apparatus. Therefore, as a focus lens gets closer to S3 by moving away from S1, a subject closer to an image-capturing apparatus is brought into focus, and an image captured by an image-capturing apparatus becomes clearer.

Referring to FIG. 3, a section between S1 and S2 may correspond to a normal-mode range of the position of a focus lens for obtaining normal-mode images, and a section between S2 and S3 may correspond to a macro-mode range of the position of a focus lens for performing close-range photography and for obtaining macro-mode images. In this case, the first fixed position and the second fixed position may be S1 and S2, respectively, which are the boundaries of the normal-mode range. However, the present invention is not restricted to this. That is, the first fixed position and the second fixed position may be S2 and S3, respectively.

Referring to FIG. 2, a blur level B1 of the first image I1 and a blur level B2 of the second image I2 are calculated S120. A blur level of an image is a numerical value indicating the level of sharpness or blurriness of an image, and may be calculated in various manners. Methods of calculating a blur level of an image according to embodiments of the present invention will be described in greater detail below with reference to FIGS. 10 and 11.

Thereafter, the position of the focus lens is determined by substituting the blur levels B1 and B2 into a relational expression (hereinafter referred to as a blur level relational expression) between two blur levels for an object at a predetermined distance from the image-capturing apparatus S130.

A method of establishing a blur level relational expression will hereinafter be described in detail.

Figure 4:
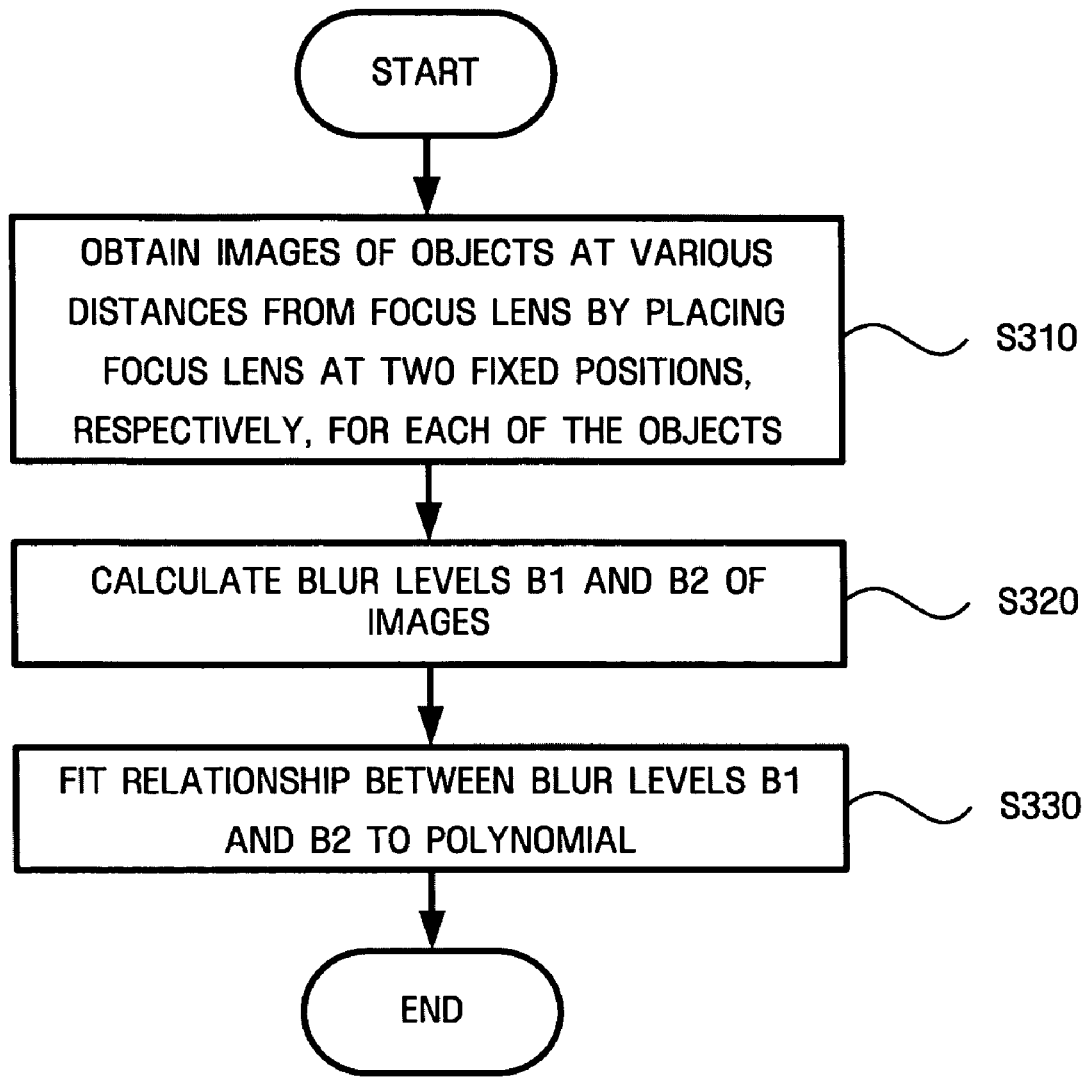
FIG. 4 illustrates a flowchart of a method of establishing a relational expression between two blur levels according to an embodiment of the present invention.
Figure 5:
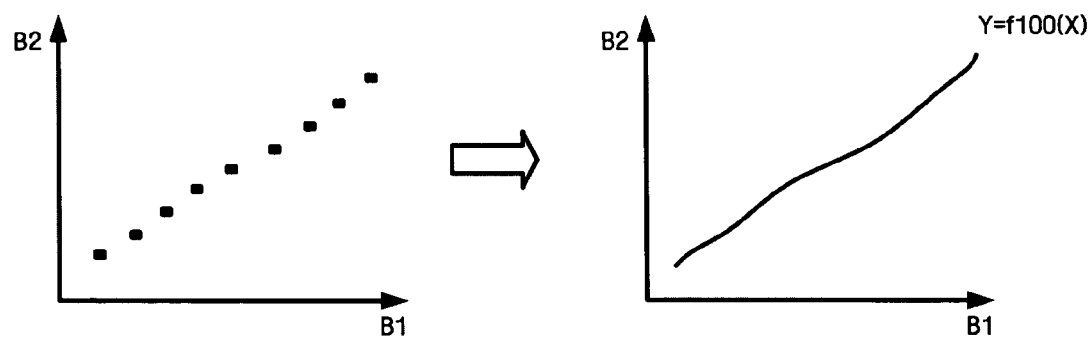
FIG. 5 illustrates graphs for explaining the method illustrated in FIG. 4.
Figure 6:
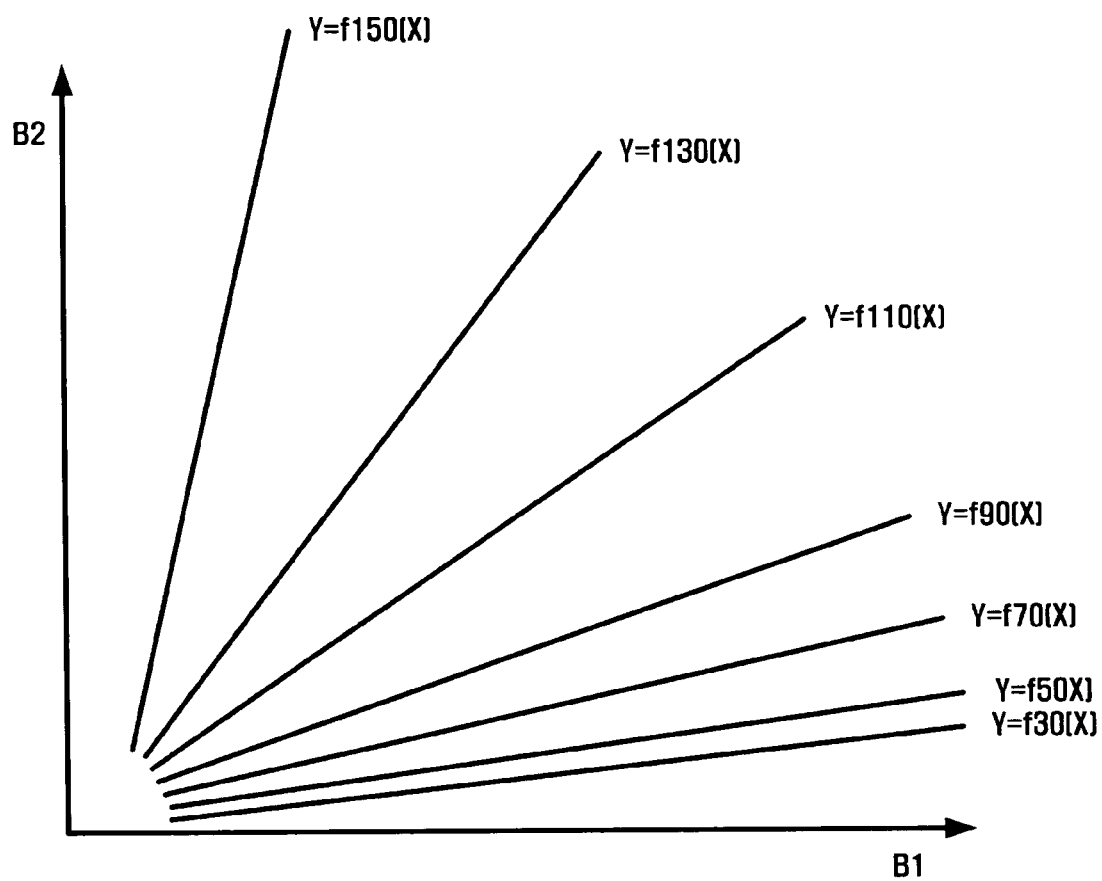
FIG. 6 illustrates graphs of a plurality of blur level relational expressions for a plurality of objects at various distances from a focus lens.

FIG. 4 illustrates a flowchart of a method of establishing a blur level relational expression according to an embodiment of the present invention, FIG. 5 illustrates graphs for explaining the method illustrated in FIG. 4, and FIG. 6 illustrates graphs of a plurality of blur level relational expressions for respective corresponding objects at various distances from an image-capturing apparatus.

Referring to FIG. 4, a plurality of pairs of images are obtained for a plurality of objects at various distances from a focus lens by placing the focus lens at two fixed positions, respectively, for each of the objects S310. Specifically, in order to use the blur levels B1 and B2 obtained in operation S120 of FIG. 2, the two fixed positions may be set to S1 and S2, respectively. For example, two images of object A are obtained by placing a focus lens at S1 and S2, respectively, and two images of object B are obtained by placing the focus lens at S1 and S2, respectively. In this manner, a plurality of image data is obtained.

Thereafter, the blur levels of the images obtained in operation S310 are calculated. That is, blur-level coordinates of each of the images obtained in operation S310 are calculated S320, and the blur-level coordinates are mapped to a B1B2 coordinate system, thereby obtaining the left graph of FIG. 5. The left graph of FIG. 5 illustrates blur level coordinates for an object at a distance of 100 cm from the focus lens.

Thereafter, an n-th order polynomial is obtained by fitting the left graph of FIG. 5 S330. The right graph of FIG. 5 is a graph of the n-th order polynomial obtained in operation S330, i.e., the polynomial Y=f100(X). The polynomial Y=f100(X) is a blur level relational expression for an object at a distance of 100 cm from the focus lens.

FIG. 6 illustrates graphs of a plurality of blur level relational expressions for respective corresponding objects at various distances from an image-capturing apparatus. Specifically, FIG. 6 illustrates graphs of a plurality of blur level relational expressions obtained by gradually varying the distance between a focus lens and an object from 30 cm to 150 cm at intervals of 20 cm. FIG. 6 illustrates a first-order polynomial, but the embodiments of the present invention are not restricted to this. That is, in order to obtain a precise blur level relational expression, fitting to a higher-order polynomial may be performed.

Therefore, the position of a focus lens may be determined by substituting the blur levels B1 and B2 into a blur level relational expression established in the above-mentioned manner.

A method of determining the position of a focus lens will hereinafter be described in further detail with reference to FIGS. 7 and 8.

Figure 7:
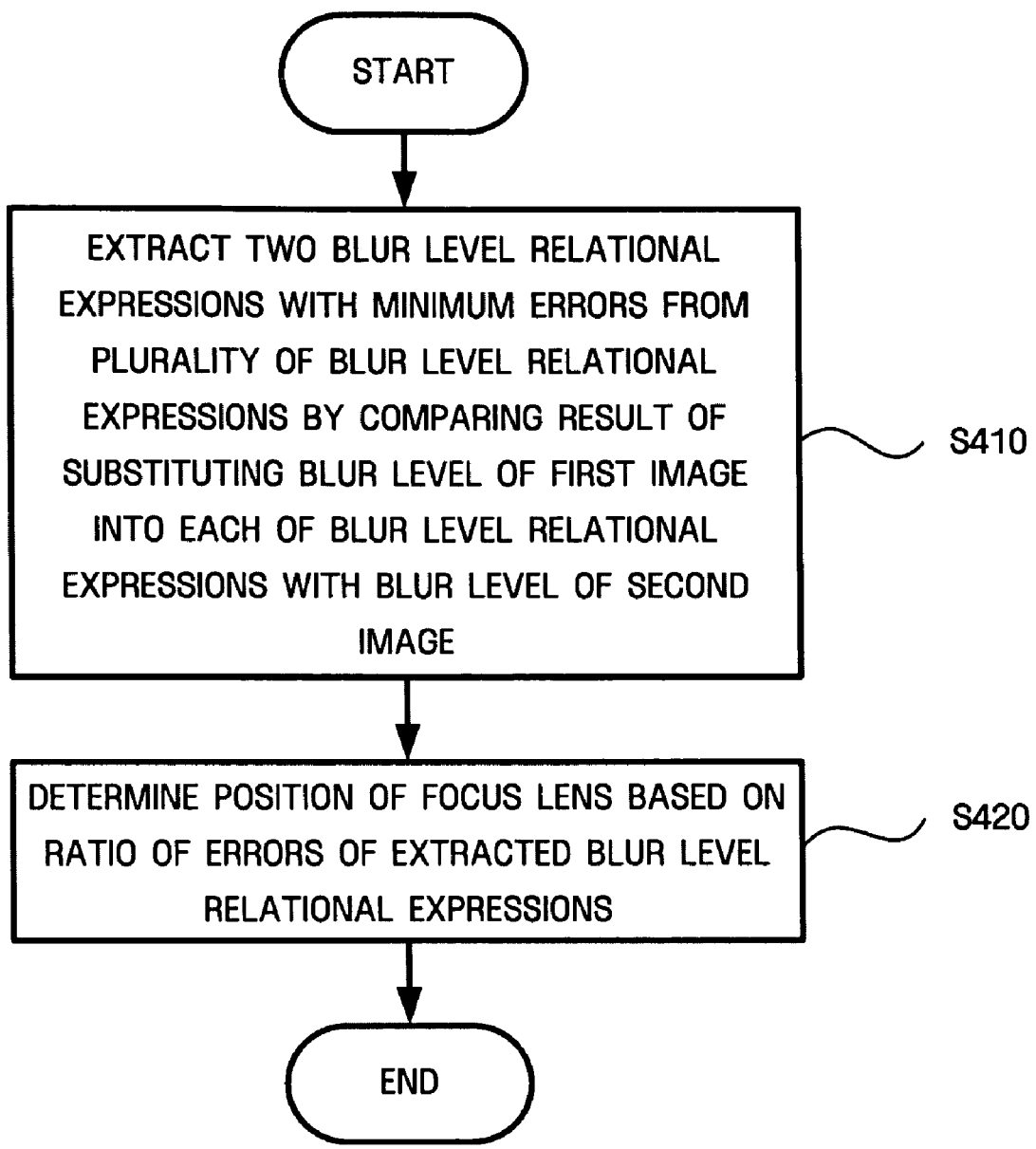
FIG. 7 illustrates a flowchart of a method of determining the position of a focus lens using a plurality of blur level relational expressions according to an embodiment of the present invention.
Figure 8:
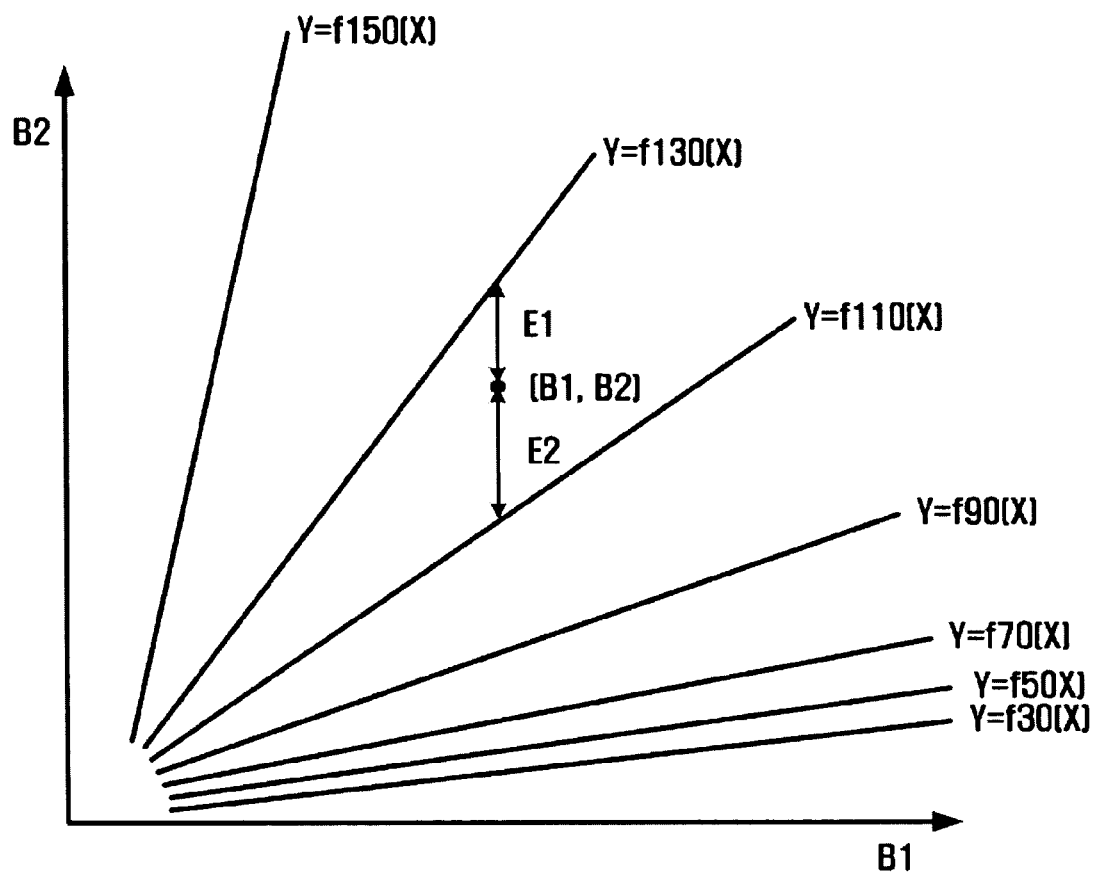
FIG. 8 illustrates graphs of a plurality of blur level relational expressions for a plurality of objects at various distances from a focus lens, and explains the method illustrated in FIG. 7.

FIG. 7 illustrates a flowchart of a method of determining the position of a focus lens by substituting blur levels into a blur level relational expression according to an embodiment of the present invention, and FIG. 8 illustrates graphs of a plurality of blur level relational expressions and the blur levels B1 and B2 and explains the method illustrated in FIG. 7.

Referring to FIG. 7, the blur levels B1 and B2 obtained in operation S120 of FIG. 2 are substituted into each of a plurality of blur level relational expressions, and two blur level relational expressions with minimum errors are selected from the plurality of blur level relational expressions S410. That is, referring to FIG. 8, the blur level B2 is compared with the result of substituting the blur level B1 into each of the blur level relational expressions f30(B1), f50(B1), f70(B1), f90(B1), f110(B1), f130(B1), and f150(B1) of FIG. 8.

Thereafter, it is determined which of the blur level relational expressions f30(B1), f50(B1), f70(B1), f90(B1), f110(B1), f130(B1), and f150(B1) of FIG. 8 produce minimum errors. In the embodiment of FIG. 8, the two blur level relational expressions with minimum errors are: Y=f130(X) and Y=f110(X). Therefore, it is determined that a subject of the first and second images I1 and I2 is located at a distance of 110-130 cm from the focus lens. As described above with reference to FIG. 3, once the distance between a focus lens and an object is determined, an optimum focal distance, i.e., a focal distance for obtaining an optimum image of the object, can also be determined.

Referring to FIG. 7, a distance P between the focus lens and the subject of the first and second images I1 and I2 is determined based on the ratio of the errors of the two blur level relational expressions obtained in operation S410 (S420). For example, the distance P may be determined as indicated by the following equation: E1:E2=f130(B1)−B2:B2−f110(B1) =130−P:P−110 where E1 and E2 indicate the errors of the two blur level relational expressions obtained in operation S410.

Figure 9:
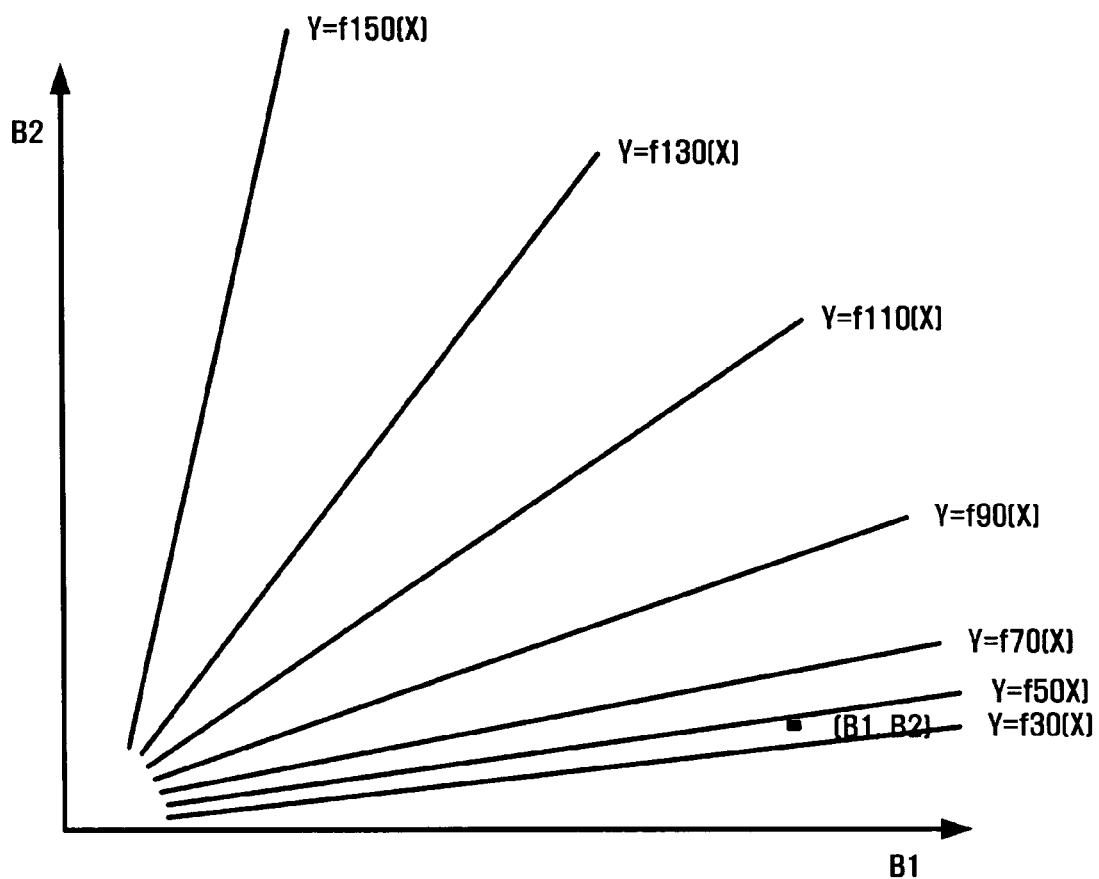
FIG. 9 illustrates the situation where a focus lens position determined by a normal-mode blur level relational expression is a focus lens position for obtaining macro-mode images.

However, if a focus lens position determined using the above-mentioned method is a position for obtaining macro-mode images, i.e., if the determined focus lens position is too close to an object, it may be almost impossible to precisely determine the position of a focus lens using the above-mentioned method. The blur level relational expressions illustrated in FIG. 9 are derived using a plurality of pairs of images which are obtained by placing a focus lens at S1 and S2, respectively. Specifically, the blur level relational expressions illustrated in FIG. 9 are obtained by varying the distance between a focus lens and an object at intervals of 20 cm.

Referring to FIG. 9, the distance between the graphs of blur level relational expressions (e.g., Y=f30(X) and Y=f50(X)) for objects close to an image-capturing apparatus is less than the distance between the graphs of blur level relational expressions (e.g., Y=f130(X) and Y=f150(X)) for objects distant from the image-capturing apparatus. When a focus lens is placed at S1 and S2, respectively, for obtaining normal-mode images, the graphs of blur level relational expressions for a close range of an image-capturing apparatus are densely distributed. In contrast, when the focus lens is placed at S2 and S3, respectively, for obtaining macro-mode images, the graphs of blur level relational expressions for a distant range of the image-capturing apparatus are densely distributed. Therefore, if a focus lens position determined using a normal-mode blur level relational expression is determined to be within a close range of an image-capturing apparatus, i.e., if the determined focus lens position is a focus lens position corresponding to a macro mode, the distance between a focus lens and an object, i.e., the position of the focus lens, may not be able to be precisely determined because blur levels have errors and there is a high probability of the occurrence of an error in the extraction of two blur level relational expressions with minimum errors due to blur level relational expressions for a close range of an image-capturing apparatus being densely distributed.

Referring to FIG. 2, if a focus lens position determined using a normal-mode blur level relational expression, which is a relational expression between two blur levels obtained in a normal mode, is a focus lens position for obtaining normal-mode images S140, an image may be obtained by placing the focus lens at the determined focus lens position. In contrast, if the determined focus lens position is a focus lens position for obtaining macro-mode images S140, a third image may be obtained S210, a blur level of the third image may be calculated S220, and the position of the focus lens may be redetermined using a macro-mode blur level relational expression S230, which is a relational expression between two blur levels obtained in a macro mode. This will hereinafter be described in further detail.

If a focus lens position determined using a normal-mode blur level relational expression is a focus lens position for obtaining macro-mode images, as illustrated in FIG. 9, a third image I3 is obtained by placing the focus lens at such a third fixed position S210.

Thereafter, such a blur level B3 of the third image I3 is calculated S220.

Thereafter, the position of the focus lens is redetermined by substituting the blur levels B2 and B3 into such a macro-mode blur level relational expression S230. The macro-mode blur level relational expression may be obtained using almost the same method as that described above with reference to FIGS. 4 and 5. That is, the macro-mode blur level relational expression may be derived from images obtained by placing the focus lens at S2 and S3, which are focus lens positions for performing close-range photography. Operation S230 may be performed using almost the same method as that described above with reference to FIGS. 7 and 8.

In short, two images may be obtained by placing a focus lens at two fixed positions (e.g., at S1 and S2), respectively, for obtaining normal-mode images, blur levels (i.e., B1 and B2) of the two images may be calculated, and the position of the focus lens may be determined by substituting the blur levels B1 and B2 into a normal-mode blur level relational expression. Then, if the determined focus lens position is a focus lens position for obtaining macro-mode images, a third image may be obtained by placing the focus lens at another fixed position (e.g., S3), a blur level (i.e., B3) of the third image may be calculated, and the position of the focus lens may be redetermined by substituting the blur levels B2 and B3 into a macro-mode blur level relational expression. In this manner, an optimum focus lens position may be determined. Then, a final image is obtained by placing the focus lens at the optimum focus lens position.

However, embodiments of the present invention also include where two images may be obtained by placing a focus lens at two fixed positions (e.g., S2 and S3) respectively, for obtaining macro-mode images, then blur levels (i.e., B2 and B3) of the two images may be calculated, and then the position of the focus lens may be determined by substituting the blur levels B2 and B3 into a macro-mode blur level relational expression. Then, if the determined focus lens position is a focus lens position for obtaining normal-mode images, a third image may be obtained by placing the focus lens at another fixed position (e.g., S1), a blur level (i.e., B1) of the third image may be calculated, and the position of the focus lens may be redetermined by substituting the blur levels B1 and B2 into a normal-mode blur level relational expression.

Therefore, according to the auto-focus method of embodiments of FIG. 2, it is possible to automatically adjust focus without needing to set neither a macro mode for performing close-range photography nor a normal mode for performing regular photography. Also, it is possible to determine the position of a focus lens based on only two or three images and thus to reduce the time required to determine the position of a focus lens.

The calculation of a blur level of an image will hereinafter be described in detail with reference to FIGS. 10 and 11.

Figure 10:
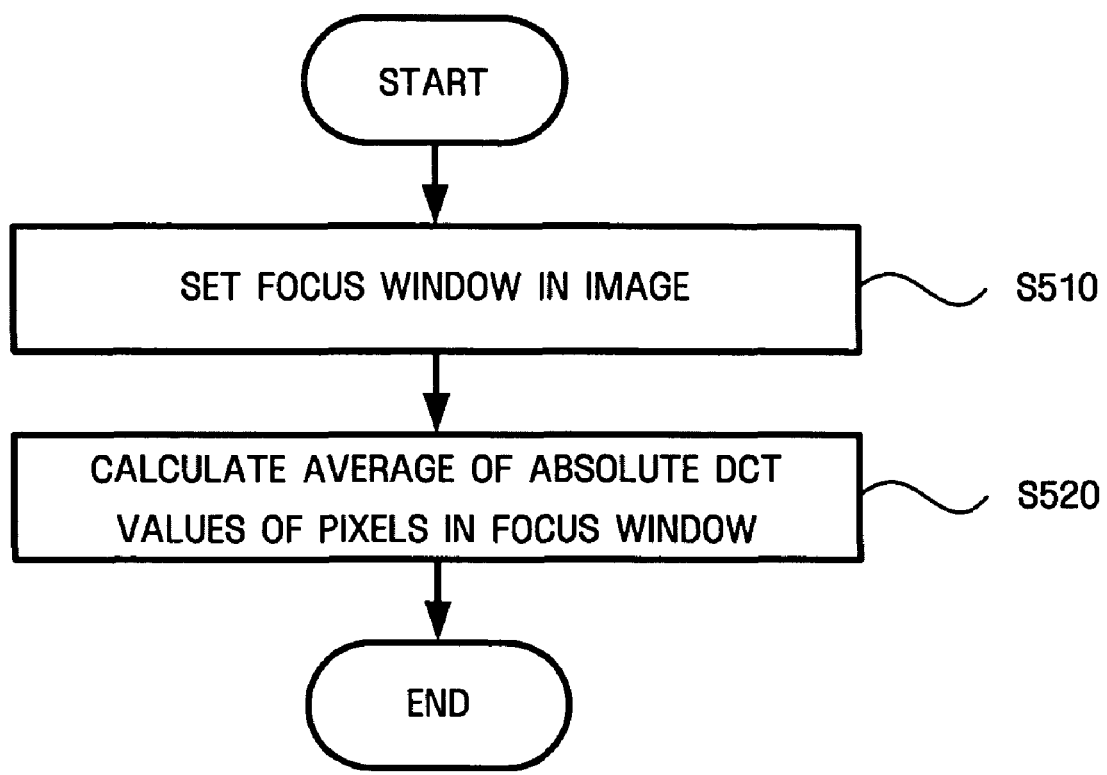
FIG. 10 illustrates a flowchart of a method of calculating a blur level according to an embodiment of the present invention.
Figure 11:
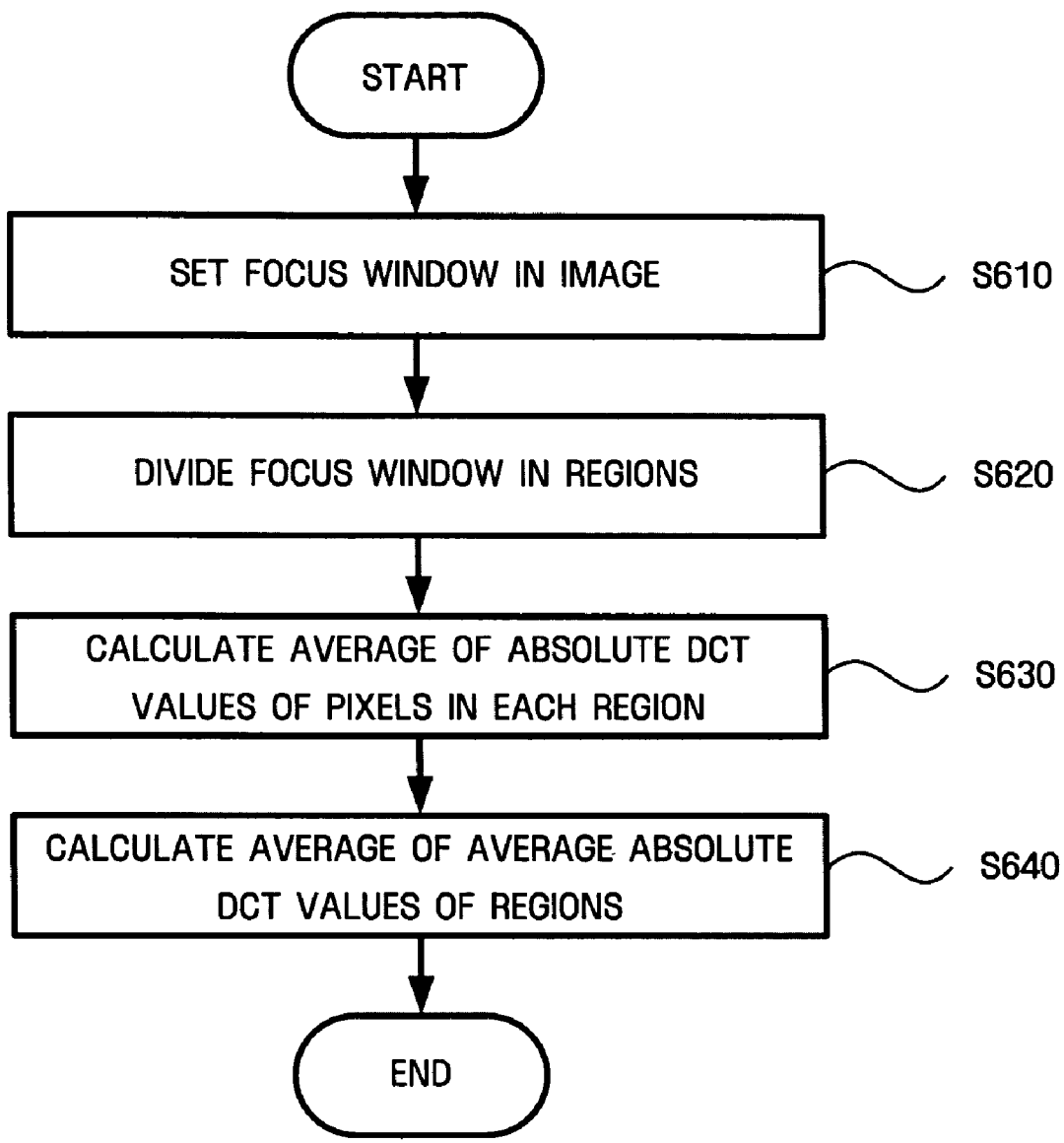
FIG. 11 illustrates a flowchart of a method of calculating a blur level according to another embodiment of the present invention.

FIG. 10 illustrates a flowchart of a method of calculating a blur level according to an embodiment of the present invention, and FIG. 11 illustrates a flowchart of a method of calculating a blur level according to another embodiment of the present invention.

Referring to FIG. 10, a focus window is set in an image S510. A portion of the image including an object of interest may be arbitrarily designated as the focus window. In general, an image of an object is captured so that the object can be rendered in the middle of the image. Thus, in operation S510, a middle portion of the image may be designated as the focus window. The focus window may be arbitrarily set by a user or may be automatically set according to the result of the analysis of an image signal.

Once the focus window is set, a blur level of the image is calculated by calculating an average of absolute discrete cosine transform (DCT) values of pixels in the focus window S520.

Referring to FIG. 11, a focus window is set in an image S610 using the same method as that used to perform S510 of FIG. 10.

Thereafter, the focus window is divided into a number of regions S620. For example, the focus window may be divided into a number of 32×32 regions. However, the present invention is not restricted to this.

Thereafter, an average (M) of absolute DCT values of pixels in each of the regions is calculated S630.

Thereafter, a blur level of the image is calculated by calculating an average of the average absolute DCT values (M) of the regions S640.

Figure 12:
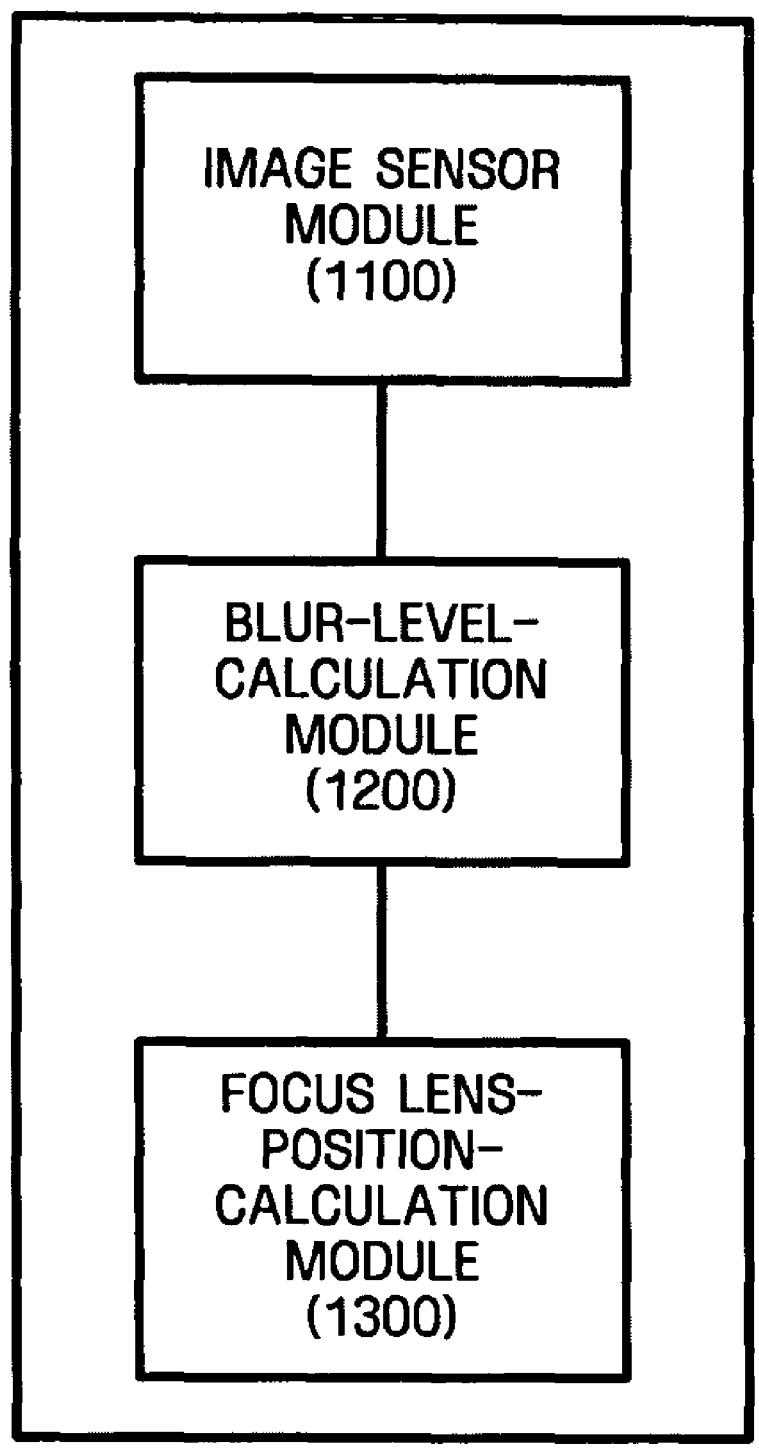
FIG. 12 illustrates a block diagram of an auto-focus apparatus for image-capturing, according to an embodiment of the present invention.

FIG. 12 illustrates a block diagram of an auto-focus apparatus for image-capturing, according to an embodiment of the present invention. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Referring to FIG. 12, the auto-focus apparatus 1000 includes an image sensor module 1100, a blur-level-calculation module 1200 and a focus-lens-position-calculation module 1300.

The image sensor module 1100 obtains an image by converting an optical signal into an electric signal. The image sensor module 1100 detects light collected by a lens and thus converts the detected light into an electric signal. Image sensors are largely classified into camera tube image sensors and solid-state image sensors such as a charge-coupled device (CCD) image sensor and a complementary metal oxide semiconductor (CMOS) image sensor.

The image sensor module 1100 obtains a first image I1 by placing a focus lens at a first fixed position, and obtains a second image I2 by placing the focus lens at a second fixed position, which is closer than the first fixed position to the image sensor module 1100. The first and second fixed positions may be positions at which the focus lens can be placed for obtaining a normal-mode image.

The blur-level-calculation module 1200 calculates a blur level B1 of the first image I1 and a blur level B2 of the second image I2.

The blur-level-calculation module 1200 may calculate the blur levels B1 and B2 by setting a focus window in the first and second images I1 and I2, respectively, and calculating the average of absolute DCT values of pixels in each of the focus windows.

Alternatively, the blur-level-calculation module 1200 may calculate the blur levels B1 and B2 by setting a focus window in the first and second images I1 and I2, respectively, dividing each of the focus windows into a number of regions, calculating the average of absolute DCT values of pixels in each of the regions of each of the focus windows, and calculating the average of the average absolute DCT pixel values of the regions of each of the focus windows.

The focus lens-position-calculation module 1300 determines the position of the focus lens by substituting the blur levels B1 and B2 into a blur level relational expression for an object at a predetermined distance from the focus lens.

A blur level relational expression may be obtained by fitting to a polynomial the relationship between the blur levels of a pair of images of an object, which are obtained by placing the focus lens at each of two fixed positions. In this case, if the two fixed positions are positions for obtaining normal-mode images, i.e., S1 and S2, the blur level relational expression may be a relational expression (hereinafter referred to as a normal-mode blur level relational expression) between normal-mode blur levels. In contrast, if the two fixed positions are positions for obtaining macro-mode images, i.e., S2 and S3, the blur level relational expression may be a relational expression (hereinafter referred to as a macro-mode blur level relational expression) between macro-mode blur levels.

If the first and second fixed positions are positions for obtaining normal-mode images, i.e., S1 and S2, the position of the focus lens may be determined using a plurality of normal-mode blur level relational expressions. In contrast, if the first and second fixed positions are positions for obtaining normal-mode images, i.e., S2 and S3, the position of the focus lens may be determined using a plurality of macro-mode blur level relational expressions.

If the focus lens position determined using the normal-mode blur level relational expression is a focus lens position for obtaining macro-mode images, a third image I3 may be obtained by placing the focus lens at S3, and a blur level B3 of the third image I3 may be calculated. Thereafter, the position of the focus lens may be determined again by substituting the blur levels B2 and B3 into each of the macro-mode blur level relational expressions. Likewise, if the focus lens position determined using the macro-mode blur level relational expression is a focus lens position for obtaining normal-mode images, a fourth image I1 may be obtained by placing the focus lens back at S1, and a blur level B1 of the fourth image I1 may be calculated. Thereafter, the position of the focus lens may be determined again by substituting the blur levels B2 and B1 into each of the normal-mode blur level relational expressions.

As described above, it is possible to determine an optimum position of a focus lens based on the distance between the focus lens and an object. Therefore, it is possible to easily determine the distance between a focus lens and an object using the auto-focus method and apparatus according to embodiments of the present invention. In addition, if an image captured by an image-capturing apparatus includes more than one object, it is possible to determine the distances of a focus lens from the respective objects by setting a focus window in the image and arbitrarily shifting the focus window in the image using the auto-focus method and apparatus according to the present invention. In this case, it is possible to create a three-dimensional (3D) map by rendering the objects with different colors according to their distances from the focus lens.

Embodiments of the present invention have been described above with reference to flowchart illustrations of user interfaces, methods, and media according to embodiments of the invention. It will be understood that each block of the flowchart illustrations, and combinations of blocks in the flowchart illustrations, can be implemented by computer readable code. These computer readable code can be provided to a processor of a general purpose computer, special purpose computer, or other programmable data.

Accordingly, in addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

An auto-focus method, medium, and apparatus according to embodiments of the present invention may have the following advantages.

First, it is possible to automatically adjust focus at high speed using the blur levels of images obtained by placing a focus lens at least at two fixed positions, respectively, or at a maximum of three fixed positions, respectively.

Second, it is possible to automatically adjust focus for both a normal mode and a macro mode without the need to switch between the normal mode and the macro mode.

Third, it is possible to create a 3D map based on the distance between a focus lens and an object.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An auto-focus method for image-capturing, comprising:
    obtaining a first image by placing a focus lens of an image-capturing apparatus at a first fixed position;
    obtaining a second image by placing the focus lens at a second fixed position;
    calculating blur levels of the first and second images; and
    determining a position of the focus lens based on the calculated blur levels of the first and second images, including applying at least one of the blur levels of the first and second images to each of a plurality of blur level relational models, where the blur level relational models each model relationships of blur levels between different paired images of respective corresponding objects at different distances from an image sensor module, with each of the paired images being previously obtained by placing the focus lens at the first and second fixed positions, respectively.

2. The auto-focus method of claim 1, wherein the first and second fixed positions are focus lens positions for obtaining normal-mode images.

3. The auto-focus method of claim 1, wherein the calculating of the blur levels of the first and second images comprises:
    setting a focus window in the first and second images, respectively; and
    calculating an average of absolute discrete cosine transform (DCT) values of pixels in each of the focus windows.

4. The auto-focus method of claim 1, wherein the calculating of the blur levels of the first and second images comprises:
    setting a focus window in the first and second images, respectively; and
    dividing each of the focus windows into a number of regions;
    calculating an average of absolute DCT values of pixels in each of the regions of each of the focus windows; and
    calculating an average of the average absolute DCT values of the regions of each of the focus windows.

5. The auto-focus method of claim 1, wherein each of the blur level relational models is obtained by placing the focus lens at the first and second fixed positions to obtain the paired images of a corresponding object at a predetermined distance from the image sensor module, calculating blur levels of the paired images, and fitting a relationship between the blur levels of the paired images to an n-th order polynomial.

6. The auto-focus method of claim 1, wherein the blur level relational models include n-th order polynomials, such that the modeling by the blur level relational models includes a fitting of an analysis of the blur levels of each of the paired images to a respective n-th order polynomial.

7. The auto-focus method of claim 1, wherein the determining of the position of the focus lens comprises:
    selecting two blur level relational models, from the plural blur level relational models, with minimum errors by comparing results of an applying of the blur level of the first image to the plural blur level relational models, respectively, with the blur level of the second image; and determining the position of the focus lens based on a ratio of errors of the two selected blur level relational models.

8. The auto-focus method of claim 2, further comprising, based upon a determination of whether the determined focus lens position is a focus lens position for obtaining macro-mode images, the method further comprises:
obtaining a third image by placing the focus lens at a third fixed position, which is closer than the second fixed position to the image sensor module;
calculating a blur level of the third image; and
redetermining the position of the focus lens based on the calculated blur levels of the second and third images, including applying at least one of the blur levels of the second and third images to each of third fixed position based plural blur level relational models, where the third fixed position based blur level relational models each model relationships of blur levels between different paired images obtained by respectively placing the focus lens at the second and third fixed positions, of respective corresponding objects at different distances from the image sensor module.

9. The auto-focus method of claim 8, wherein the second and third fixed positions are focus lens positions for obtaining macro-mode images.

10. The auto-focus method of claim 8, wherein each of the blur level relational models is obtained by placing the focus lens at the second and third fixed positions to obtain the second and third position respective paired images of a corresponding object at a predetermined distance from the image sensor module, calculating blur levels of the paired images, and fitting a relationship between the blur levels of the paired images to an n-th order polynomial.

11. An auto-focus method for image-capturing, comprising:
obtaining a first image by placing a focus lens of the image-capturing apparatus at a first fixed position;
obtaining a second image by placing the focus lens at a second fixed position;
calculating blur levels of the first and second images; and
determining a position of the focus lens by substituting the blur levels of the first and second images into each of a plurality of blur level relational polynomial functions, which are derived from a plurality of pairs of images of respective corresponding objects at different distances from an image sensor module, each of the pairs of images being obtained by placing the focus lens at the first and second fixed positions, respectively,
wherein the first and second fixed positions are focus lens positions for obtaining normal-mode images,
the method further comprising, if the determined focus lens position is a focus lens position for obtaining macro-mode images:
obtaining a third image by placing the focus lens at a third fixed position, which is closer than the second fixed position to the image sensor module;
calculating a blur level of the third image; and
redetermining the position of the focus lens by substituting the blur levels of the second and third images into each of a plurality of blur level relational polynomial functions, which are derived from a plurality of pairs of images of respective corresponding objects at different distances from the image sensor module, each of the pairs of images being obtained by placing the focus lens at the second and third fixed positions, respectively.

12. The auto-focus method of claim 11, wherein the second and third fixed positions are focus lens positions for obtaining macro-mode images.

13. The auto-focus method of claim 11, wherein each of the blur level relational polynomial functions is obtained by placing the focus lens at the second and third fixed positions to obtain a pair of images of a corresponding object at a predetermined distance from the image sensor module, calculating blur levels of the pair of images, and fitting a relationship between the blur levels of the pair of images to a polynomial.

14. An auto-focus method for image-capturing, comprising:
obtaining a first image by placing a focus lens of the image-capturing apparatus at a first fixed position;
obtaining a second image by placing the focus lens at a second fixed position;
calculating blur levels of the first and second images; and
determining a position of the focus lens by substituting the blur levels of the first and second images into each of a plurality of blur level relational polynomial functions, which are derived from a plurality of pairs of images of respective corresponding objects at different distances from an image sensor module, each of the pairs of images being obtained by placing the focus lens at the first and second fixed positions, respectively,
wherein the determining of the position of the focus lens comprises:
selecting two relational polynomial functions with minimum errors by comparing the results of substituting the blur level of the first image into the blur level relational polynomial functions, respectively, with the blur level of the second image; and
determining the position of the focus lens based on a ratio of errors of the two selected relational polynomial functions.

15. An auto-focus apparatus for image-capturing, comprising:
an image sensor module which obtains an image by converting an optical signal into an electric signal;
a blur-level-calculation module which calculates a blur level of the image; and
a focus lens-position-calculation module which determines a position of a focus lens by applying the blur level of the image to a plurality of blur level relational models,
wherein the image sensor module obtains a first image by placing a focus lens of an image-capturing apparatus at a first fixed position, and obtains a second image by placing the focus lens at a second fixed position,
wherein the blur-level-calculation module calculates blur levels of the first and second images, and
wherein the focus lens-position-calculation module determines the position of the focus lens based on the calculated blur levels of the first and second images, with the determining of the position of the focus lens including by substituting applying at least one of the blur levels of the first and second images to each of the plurality of blur level relational models, where the blur level relational models each model relationships of blur levels between different paired images of respective corresponding objects at different distances from the image sensor module, with each of the paired images being previously obtained by placing the focus lens at the first and second fixed positions, respectively.

16. The auto-focus apparatus of claim 15, wherein the first and second fixed positions are focus-lens positions for obtaining normal-mode images.

17. The auto-focus apparatus of claim 16, wherein, based upon a determination of whether the focus lens position determined by the focus lens-position-calculation module is a focus lens position for obtaining macro-mode images, the image sensor module obtains a third image by placing the focus lens at a third fixed position, which is closer than the second fixed position to an image sensor module, the blur-level-calculation module calculates a blur level of the third image, and the focus lens-position-calculation module re-determines the position of the focus lens based on the blur levels of the second and third images, with the determining of the position of the focus lens including applying at least one of the blur levels of the second and third images to each of third fixed position based plural blur level relational models, where the third fixed position based blur level relational models each model relationships of blur levels between different paired images obtained by respectively placing the focus lens at the second and third fixed positions, of respective corresponding objects at different distances from the image sensor module.

18. The auto-focus apparatus of claim 17, wherein the second and third fixed positions are focus lens positions for obtaining macro-mode images.

19. The auto-focus apparatus of claim 15, wherein the blur-level-calculation module calculates a blur level of an arbitrary image by setting a focus window in the arbitrary image and calculating an average of absolute DCT values of pixels in the focus window.

20. The auto-focus apparatus of claim 15, wherein the blur-level-calculation module calculates a blur level of an arbitrary image by setting a focus window in the arbitrary image, dividing the focus window into a number of regions, calculating an average of absolute DCT values of pixels in each of the regions and calculating an average of the average absolute DCT values of the regions.

21. The auto-focus apparatus of claim 15, wherein each of the blur level relational models is obtained by placing the focus lens at the first and second fixed positions to obtain the paired images of a corresponding object at a predetermined distance from the image sensor module, calculating blur levels of the paired images, and fitting a relationship between the blur levels of the paired images to an n-th order polynomial.

22. The auto-focus apparatus of claim 15, wherein the blur level relational models include n-th order polynomials, such that the modeling by the blur level relational models includes a fitting of an analysis of the blur levels of each of the paired images to a respective n-th order polynomial.

23. The auto-focus apparatus of claim 15, wherein the focus lens-position-calculation module determines the position of the focus lens by comparing results of an applying of the blur level of the first image to each of the plural blur level relational models, respectively, with the blur level of the second image, selecting two relational models with minimum errors based on the results of the comparison and determining the position of the focus lens based on a ratio of errors of the two selected relational models.

24. An auto-focus apparatus for image-capturing, comprising:
an image sensor module which obtains an image by converting an optical signal into an electric signal;
a blur-level-calculation module which calculates a blur level of the image; and
a focus lens-position-calculation module which determines a position of a focus lens by substituting the blur level of the image into a plurality of blur level relational polynomial functions for respective corresponding objects at various distances from the image sensor module,
wherein the image sensor module obtains a first image by placing a focus lens of an image-capturing apparatus at a first fixed position, and obtains a second image by placing the focus lens at a second fixed position, the blur-level-calculation module calculates blur levels of the first and second images, and the focus lens-position-calculation module determines the position of the focus lens by substituting the blur levels of the first and second images into each of a plurality of blur level relational polynomial functions, of respective corresponding objects at different distances from the image sensor module, each of the pairs of images being obtained by placing the focus lens at the first and second fixed positions, respectively,
wherein the first and second fixed positions are focus-lens positions for obtaining normal-mode images, and
wherein, if the focus lens position determined by the focus lens-position-calculation module is a focus lens position for obtaining macro-mode images, the image sensor module obtains a third image by placing the focus lens at a third fixed position, which is closer than the second fixed position to an image sensor module, the blur-level-calculation module calculates a blur level of the third image, and the focus lens-position-calculation module re-determines the position of the focus lens by substituting the blur levels of the second and third images into each of a plurality of blur level relational polynomial functions which are respectively derived from a plurality of pairs of images obtained by placing the focus lens at the second and third fixed positions.

25. The auto-focus apparatus of claim 24, wherein the second and third fixed positions are focus lens positions for obtaining macro-mode images.

26. An auto-focus apparatus for image-capturing, comprising:
an image sensor module which obtains an image by converting an optical signal into an electric signal;
a blur-level-calculation module which calculates a blur level of the image; and
a focus lens-position-calculation module which determines a position of a focus lens by substituting the blur level of the image into a plurality of blur level relational polynomial functions for respective corresponding objects at various distances from the image sensor module,
wherein the image sensor module obtains a first image by placing a focus lens of an image-capturing apparatus at a first fixed position, and obtains a second image by placing the focus lens at a second fixed position, the blur-level-calculation module calculates blur levels of the first and second images, and the focus lens-position-calculation module determines the position of the focus lens by substituting the blur levels of the first and second images into each of a plurality of blur level relational polynomial functions, of respective corresponding objects at different distances from the image sensor module, each of the pairs of images being obtained by placing the focus lens at the first and second fixed positions, respectively,
wherein the focus lens-position-calculation module determines the position of the focus lens by comparing the results of substituting the blur level of the first image into the blur level relational polynomial functions, respectively, with the blur level of the second image, selecting two relational polynomial functions with minimum errors based on the results of the comparison and determining the position of the focus lens based on a ratio of errors of the two selected relational polynomial functions.

* * * * *

UNITED STATES PATENT AND TRADEMARK OFFICE
CERTIFICATE OF CORRECTION

PATENT NO. : 7,941,042 B2  
APPLICATION NO. : 12/081499  
DATED : May 10, 2011  
INVENTOR(S) : Byung-kwan Park et al.

Page 1 of 1

It is certified that error appears in the above-identified patent and that said Letters Patent is hereby corrected as shown below:

Column 12, Line 56, in Claim 15, before "applying" delete "by substituting"

Signed and Sealed this  
Twenty-first Day of February, 2012

David J. Kappos  
*Director of the United States Patent and Trademark Office*